United States Patent [19]

Kato et al.

[11] Patent Number: 5,488,545
[45] Date of Patent: Jan. 30, 1996

[54] LIGHTING FIXTURE CONTROL APPARATUS FOR VEHICLE

[75] Inventors: Hideyuki Kato, Nishio; Ryoichi Sugawara, Nagoya; Yasutoshi Horii, Toyoake; Hiromi Hiramatsu, Anjo, all of Japan

[73] Assignee: Nippondenso Co., Ltd., Kariya, Japan

[21] Appl. No.: 266,742

[22] Filed: Jun. 28, 1994

[30] Foreign Application Priority Data

Jun. 30, 1993 [JP] Japan .................................. 5-161037
Apr. 28, 1994 [JP] Japan .................................. 6-090925

[51] Int. Cl.$^6$ ........................................................ F21V 8/00
[52] U.S. Cl. ............................... 362/32; 362/61; 362/80; 385/39
[58] Field of Search ............................ 362/32, 61, 80, 362/227, 326, 235, 242, 244; 385/38, 50, 51, 39

[56] References Cited

U.S. PATENT DOCUMENTS

| | | | |
|---|---|---|---|
| 1,372,724 | 3/1921 | Stine | 431/328 X |
| 1,901,086 | 3/1933 | Cox | 431/347 X |
| 1,910,020 | 5/1933 | Boutillier et al. | 431/328 |
| 3,053,316 | 9/1962 | Flynar | 431/328 X |
| 3,170,504 | 2/1965 | Lanning | 431/328 |
| 4,919,609 | 4/1990 | Sarkisian et al. | 431/328 X |
| 4,958,263 | 9/1990 | Davenport et al. | 362/32 |
| 5,222,793 | 6/1993 | Davenport et al. | 362/32 |
| 5,321,586 | 6/1994 | Mege et al. | 362/32 |
| 5,343,367 | 8/1994 | Davenport et al. | 362/32 |

FOREIGN PATENT DOCUMENTS

| | | | |
|---|---|---|---|
| 558007 | 6/1957 | Belgium | 431/328 |
| 0036411 | 2/1991 | Japan | 431/326 |
| 4100935 | 9/1992 | Japan . | |
| 4301806 | 10/1992 | Japan . | |
| 5264873 | 10/1993 | Japan . | |
| 5266701 | 10/1993 | Japan . | |
| 627325 | 6/1994 | Japan . | |
| 721802 | 1/1995 | Japan . | |
| 159935 | 3/1921 | United Kingdom | 431/347 |
| 416802 | 9/1934 | United Kingdom | 431/347 |
| 1078951 | 8/1967 | United Kingdom | 431/328 |

*Primary Examiner*—Ira S. Lazarus
*Assistant Examiner*—Thomas M. Sember
*Attorney, Agent, or Firm*—Cushman, Darby & Cushman

[57] ABSTRACT

A lighting fixture apparatus for a vehicle is disclosed wherein both left and right side lighting fixtures or lamps may not be extinguished simultaneously and maintain a necessary function even if a light source extinguishes due to malfunction of the light source or its control circuit. Two optical transmission devices are provided each of which has a light source, two optical cables connected to both sides of the light source, and flat and hot zone luminous intensity distribution lenses connected to both ends of the two optical cables. The flat and hot zone luminous intensity distribution lenses are distributed to both the head lamps. An illuminating range obtained by combining illuminating ranges wherein both the lenses mounted on one of the optical transmission devices illuminate is similar to an illuminating range obtained by combining illuminating ranges wherein both the lenses mounted on the other optical transmission device illuminate. Thus, even if one of the light sources extinguishes the illuminating range and simultaneous lighting of both the lighting fixtures may be maintained.

12 Claims, 4 Drawing Sheets

LIGHTING FIXTURE CONTROL APPARATUS FOR VEHICLE

BACKGROUND OF THE INVENTION

The present invention relates to a lighting fixture apparatus for a vehicle, and more particularly to a head lamp apparatus which is used to propagate light emitted from central light sources to head lamps through optical cables.

As described in for instance the specification of a Japanese patent application No. 7509/1992 as a head lamp apparatus for an automotive vehicle in recent years, there is an apparatus which is utilized as head lamps for the automotive vehicle by analyzing light into spectral light by a single central light source and propagating the spectral light to lighting fixtures through optical cables.

In the aforementioned head lamp apparatus, however, used is the single central light source which self-contains a single bulb. Therefore, the spectral light outgoing through the optical cables into the right and left lighting fixtures is simultaneously extinguished, in case there has occurred extinguishment caused by malfunction of the bulb itself or bulb extinguishment caused by malfunction of its control circuit. When such trouble occurs during night travelling, accordingly, it becomes instantaneously impossible to carry out a function as the head lamp apparatus.

As has been shown in an early Japanese patent publication No. 301806/1992 as another prior art, there is an example in which the optical cables are coupled to each other at their intermediate portions. However, it is difficult to produce optical cables having such a coupling structure. Moreover there occurs large optical loss at the coupling portion.

Accordingly the present applicants have filed a Japanese patent application with an application No. 161037/1993. In the Japanese patent application there is proposed a head lamp apparatus for an automotive vehicle in which all the lighting fixtures may not be simultaneously extinguished even if the bulb extinguishment is caused.

However, there is a problem that the function as the head lamp apparatus for an automotive vehicle may not be sufficiently shown because an illuminating range may not be enough obtained by only the technique proposed in the specification of the Japanese patent application No. 161037/1993.

SUMMARY OF THE INVENTION

To resolve the above-mentioned problems it is, therefore, a first object of the present invention to provide a lighting fixture apparatus for a vehicle in which left and right lighting fixtures may not be simultaneously extinguished, even if there has occurred extinguishment caused by a defect of a bulb itself or bulb extinguishment caused by malfunction of its control circuit.

It is a second object of the present invention to provide a lighting fixture apparatus for a vehicle in which an illuminating range may be enough obtained and of which the function may be sufficiently exhibited even if bulb extinguishment is caused.

According to the present invention, the foregoing objects are attained by providing a lighting fixture apparatus for a vehicle which comprises a plurality of independent light sources, control means provided correspondingly to the plurality of light sources and for controlling a corresponding single light source independently, lighting fixtures for forming into a desired luminous intensity distribution light emitted by the plurality of light sources, and optical cables for propagating the light emitted from the plurality of light sources to the lighting fixtures.

Preferably, a plurality of lighting fixtures which have different luminous intensity distribution means are provided by way of the optical cables on an independent and single light source in the plurality of light sources.

With the above-mentioned construction, light emitted from the light sources under control of the control means is propagated to the lighting fixtures through the optical cables. The propagated light is illuminated by the lighting fixtures as illuminating light having a desired luminous intensity distribution. In this instance, on the vehicle mounted are a plurality of at least independent light sources and control means arranged correspondingly to the light sources and having a control function. Accordingly, even if more than at least one of the light sources is extinguished due to defects caused to for instance the light source or the control means, all the lighting fixtures may not be simultaneously extinguished unless the remaining light sources are simultaneously extinguished.

Furthermore, on the single lighting source provided are lighting fixtures having a different function. Accordingly, even if the single light source is extinguished, the lighting fixtures having the same function may not be simultaneously extinguished instantaneously. It may be, therefore, prevented to lose a function of a certain kind instantaneously.

Moreover, according to the present invention, light emitted from a first light source of a first optical transmission device is propagated by first right and first left optical cables to first right and first left projectors respectively. Light emitted from a second light source of a second optical transmission device is propagated by second right and second left optical cables to second right and second left projectors respectively.

The first right illuminating range illuminated by the first right projector and the first left illuminating range illuminated by the first left illuminating projector are combined to form a first illuminating range whereas the second right illuminating range illuminated by the second right projector and the second left illuminating range illuminated by the second left illuminating projector are combined to form a second illuminating range.

And the first illuminating range in which the first optical transmission device illuminates and the second illuminating range in which the second optical transmission device are constructed so as to be near ranges.

Accordingly, even if either one of the first and second light sources is extinguished, light emitted from the optical transmission device which is not extinguished illuminates an illuminating range near to that before the extinguishment. Thus, it is possible to maintain a near illuminating range before and after the extinguishment.

If the first and second illuminating ranges are constructed to be similar, light emitted from the optical transmission device which is not extinguished illuminates an illuminating range similar to that before the extinguishment, even if either one of the first and second light sources is extinguished. Thus, it is possible to maintain the similar illuminating range after the extinguishment.

Furthermore, even if the first light source is extinguished, it is possible to maintain lighting at the left and right sides if the second right and second left projectors illuminating light emitted from the second light source which is not extinguished are mounted on both the left and right lighting fixtures.

Even if the second light source is extinguished, conversely, it is possible to maintain lighting at both the left and right sides if the first right and first left projectors illuminating light issued from the first light source which is not extinguished are mounted on both the left and right lighting fixtures.

Moreover, an illuminating range formed by combination of the first right and second right illuminating ranges which are illuminated respectively by the first right and second right projectors arranged at the right side of the vehicle may be made in a range near to an illuminating range formed by combination of the first left and second left illuminating ranges which are illuminated respectively by the first left and second left projectors arranged at the right side of the vehicle.

DETAILED DESCRIPTION OF THE PREFERRED EMBODIMENTS

Figure 1:
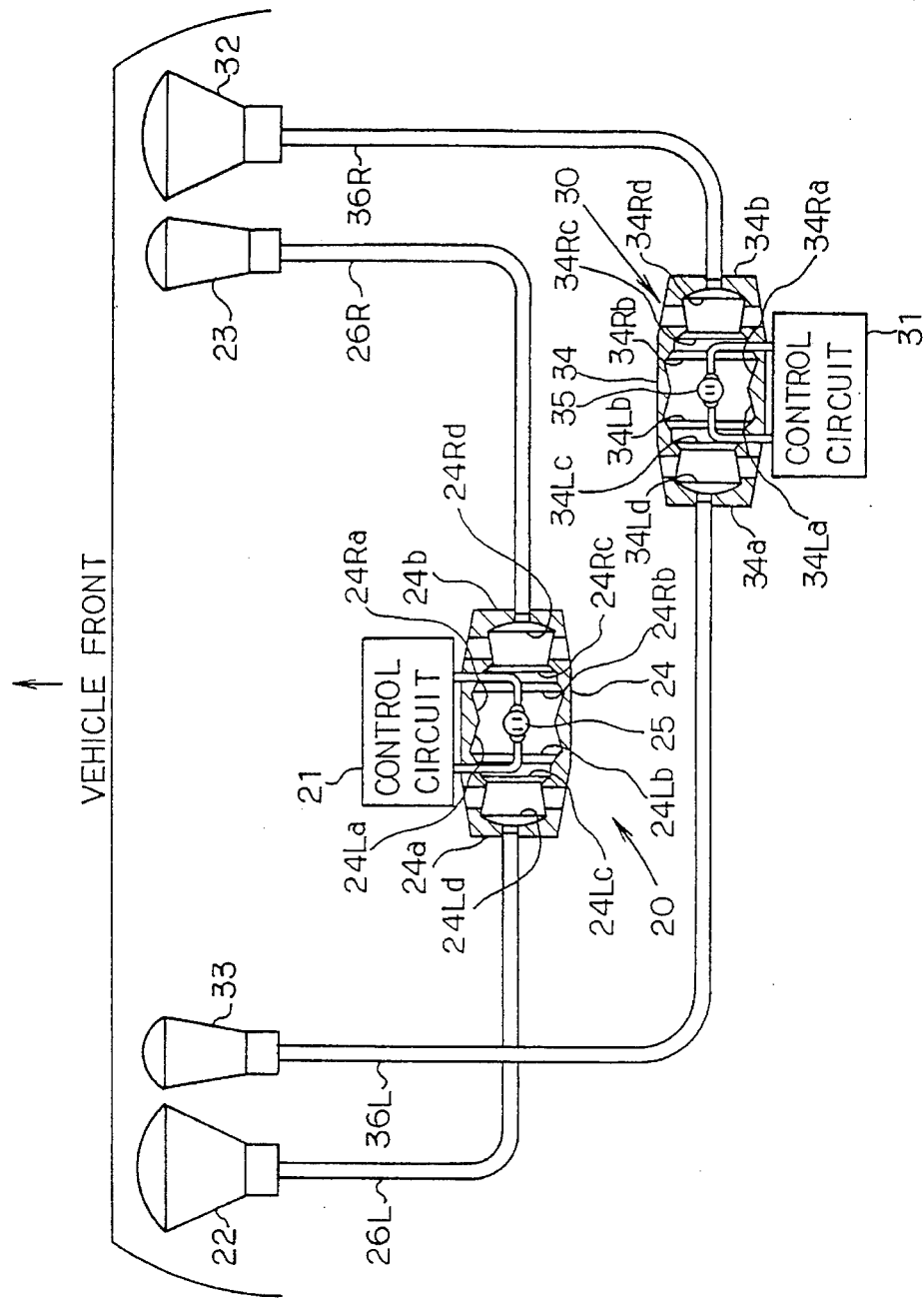
FIG. 1 is a partially broken plane view illustrating construction of an embodiment of lighting fixture apparatus for an automotive vehicle according to the present invention.

Hereinafter, the present invention will be explained with reference to embodiments shown in the drawings.

In the embodiments explained is the case wherein the present invention is applied to a head lamp apparatus for an automotive vehicle. FIG. 1 is a view showing construction of an embodiment of the present invention.

As shown in FIG. 1 the head lamp apparatus for the automotive vehicle is provided with central light sources 20, 30 arranged at a center of a front portion of the vehicle and with control circuits 21, 31 for controlling the central light sources 20, 30. The head lamp apparatus is also provided with a lighting fixture 22 (colorless, for instance) for low beam and a lighting fixture 23 (yellow, for instance) for fog arranged in bilateral symmetry with respect to the central light source 20 and with a lighting fixture 32 (colorless) for low beam and a lighting fixture 33 (yellow) for fog arranged in bilateral symmetry with respect to the central light source 30.

The central light source 20 has a substantially cylindrical casing 24 on an inner peripheral wall of which a line light source or discharge tube 25 is arranged along an axial direction of the casing 24. On the inner peripheral wall of the casing 24 each of left side elliptical mirrors 24La–24Ld and each of right side elliptical mirrors 24Ra–24Rd are formed in bilateral symmetry with respect to the discharge tube 25. Thus, light discharged by the discharge tube 25 is reflected by the right side elliptical mirror 24Ra and each of the left side elliptic mirrors 24Lb–24Ld to be converged on a center of a right side wall 24b of the casing 24 and also is reflected by the left side elliptical mirror 24La and each of the right side elliptic mirrors 24Rb–24Rd to be converged on a center of a left side wall 24a of the casing 24. Furthermore, in relation to the central light source 30 light discharged by a discharge tube 35 is also converged on a center of a right side wall 34b and a center of a left side wall 34a like the case of the aforementioned central light source 20.

For propagating to the respective lighting fixtures light of the light source 20 converged at the centers of the above-mentioned left and right side walls 24a and 24b, a single optical cable 26L is connected between the lighting fixture 22 for low beam and the light source 20 whereas a single optical cable 26R is connected between the lighting fixture 23 for fog and the light source 20. Meanwhile, an optical cable 36R and an optical cable 36L are alike connected between the lighting fixture 32 for low beam and lighting fixture 33 for fog and the light source 30 respectively.

With the aforementioned construction, light of the central light sources 20, 30 controlled by the control circuits 21, 31 is propagated to the lighting fixtures through the optical cables. Then the propagated light is illuminated by the lighting fixtures as illuminating light having a desired luminous intensity distribution.

Here it is assumed that one of the discharge tubes has been burned out or malfunction has been caused to one of the control circuits. However, in the head lamp apparatus for the vehicle of the present embodiment the two central light sources are equipped and the two control circuits for controlling correspondingly to the central light sources are arranged. Accordingly, even if one of the discharge tubes is burned out or malfunction is caused to one of the control circuits, there does not occur the fact that the left and right lighting fixtures are simultaneously extinguished, so far as such defect is not caused to another discharge tube or another control circuit. Therefore there may not be occurred such a problem that it becomes instantaneously impossible to realize a function as head lamps during night travelling.

Furthermore there is the following characteristic in the aforementioned embodiment.

That is, the characteristic is that light to be propagated to the lighting fixture 22 for low beam and lighting fixture 23 for fog which have an entirely different function is taken out from the single central light source 20 through the optical cables 26R, 26L. Namely, it may be prevented by introducing light from the single central light source 20 into the lighting fixtures 22, 23 having the different function that the lighting fixtures 22, 23 having the same different function are simultaneously extinguished, differently from a conventional system carrying only left and right lighting fixtures for low beam on a single central light source.

That is, by mounting the lighting fixtures having the different function on the single central light source, it may be prevented that the lighting fixtures having the same function are instantaneously extinguished and also to induce nonconformity that a function of the head lamp apparatus is instantaneously lost.

Figure 2:
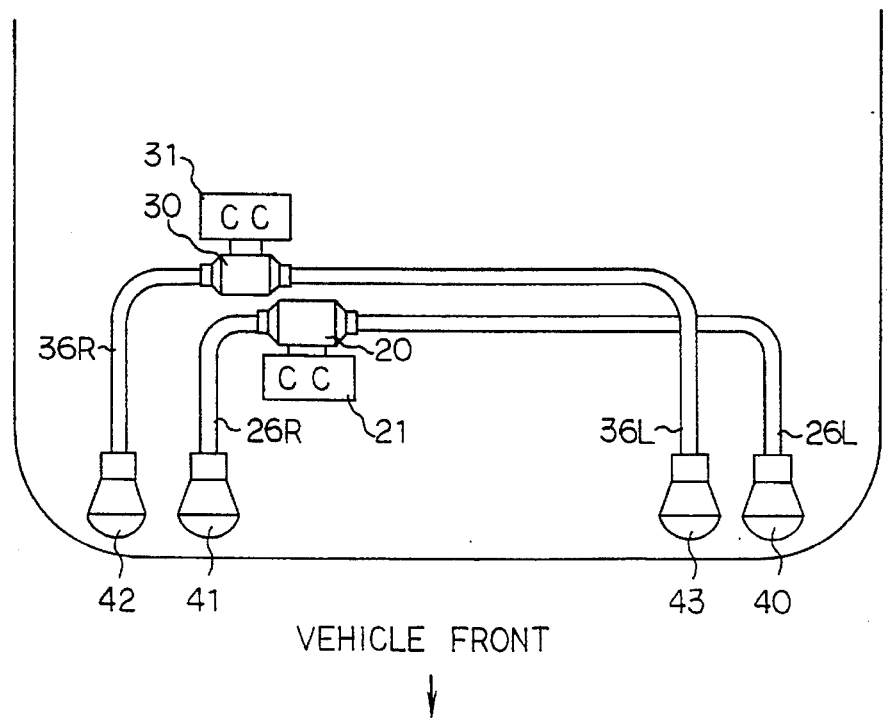
FIG. 2 is a plane view illustrating construction of another embodiment of a lighting fixture apparatus for an automotive vehicle.

In addition, in the above-mentioned embodiment shown in FIG. 1 the lighting fixture 22 for low beam and lighting fixture 23 for fog are connected to the single central light source 20. However, as shown in for instance FIG. 2 a lighting fixture 40 for low beam and a lighting fixture 41 for high beam may be connected to the single central light source 20 without limitation to the lighting fixtures 22, 23. Similarly, a lighting fixture 42 for low beam and a lighting fixture 43 for high beam (which are different in illuminating range) may be connected to the single center light source 30 without limitation to the lighting fixtures 32, 33.

Figure 3:
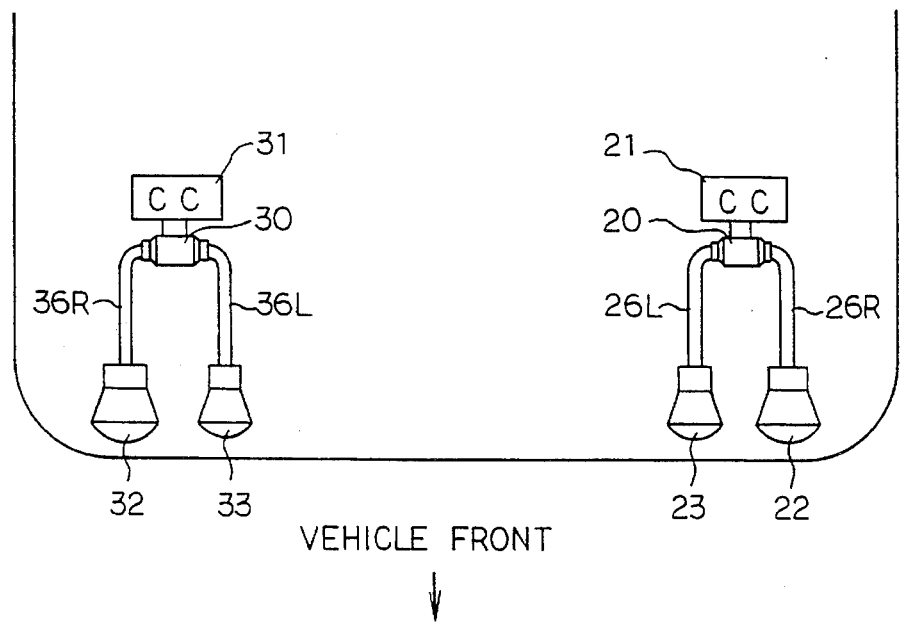
FIG. 3 is a plane view illustrating construction of still another embodiment of a lighting fixture apparatus for an automotive vehicle.

In the aforementioned embodiment shown in FIG. 1, the lighting fixture 22 for low beam and lighting fixture 23 for fog are arranged left and right apart from each other on the front portion of the vehicle, and the lighting fixture 33 for fog and lighting fixture 32 for low beam are arranged like them. As shown in for instance FIG. 3 with limitation to this, however, the lighting fixtures 22, 23 for low beam and fog may be arranged at the left side of the vehicle front portion with the central light source 20, the optical cables 26L, 26R and the control circuit 21 whereas the lighting fixtures 32, 33 for low beam and fog may be arranged at the right side of the vehicle front portion with the central light source 30, the optical cables 36L, 36R and the control circuit 31.

Figure 4:
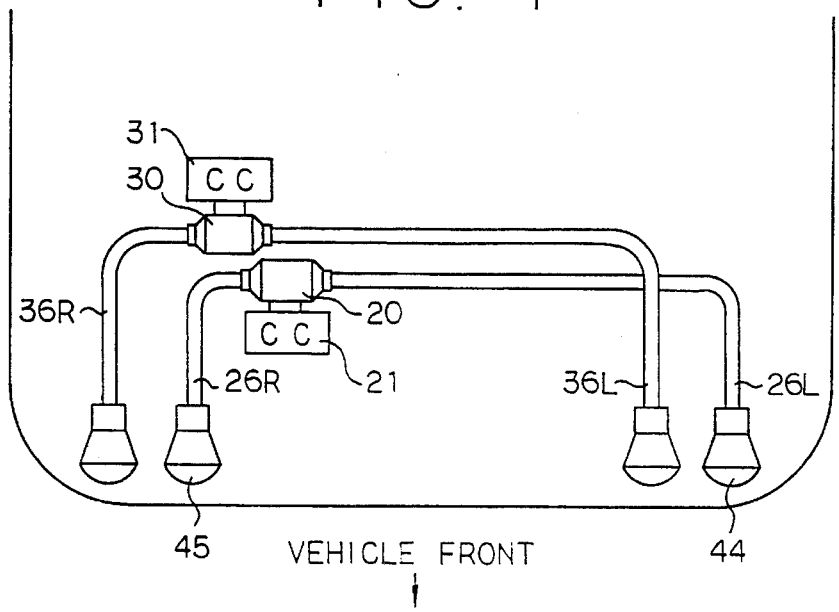
FIG. 4 is a plane view illustrating construction of another embodiment of a lighting fixture apparatus for an automotive vehicle.

Furthermore, in case construction that lighting fixtures 44, 45 for the same function or low beam are connected to the single central light source 20 is adapted in plurality as shown in FIG. 4, it is possible to prevent nonconformity that the function is instantaneously lost even if the lighting fixtures of the same function are connected to the single central light source.

Figure 5:
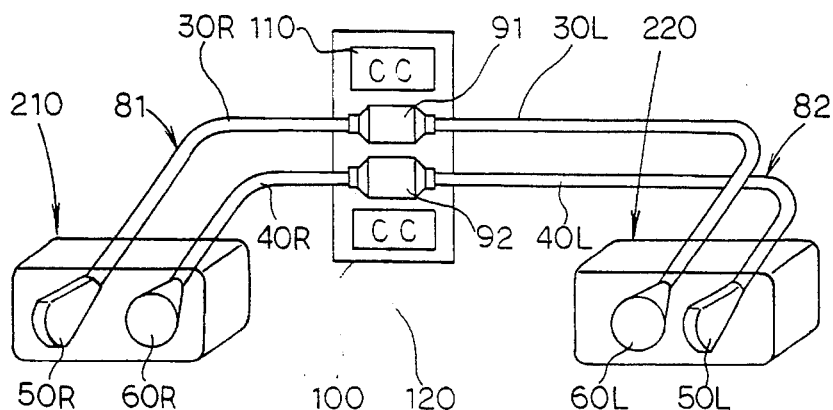
FIG. 5 is a perspective view illustrating construction of another embodiment of a lighting fixture apparatus for an automotive vehicle according to the present invention.

FIG. 5 is a perspective view illustrating a construction of still further embodiment of the present invention.

In FIG. 5, reference numeral 100 indicates a central light source including therein two light sources, namely first and second light sources 91 and 92. Light emitted from a discharge tubed (not shown) within the first light source 91 under control of control means or a high electric voltage generator 110 for the discharge tube is divided and converged by a reflector (not shown) toward both of an optical cable 30R for propagating light to a flat luminous intensity distribution lens 50R and an optical cable 30L for propagating light to a hot zone luminous intensity distribution lens 60L. Furthermore, light emitted from a discharge tube (not shown) within the second light source 92 under control of control means or a high electric voltage generator 120 for the discharge tube is divided and converged by a reflector (not shown) toward both of an optical cable 40R for propagating light to a hot zone luminous intensity distribution lens 60R and an optical cable 40L for propagating light to a flat luminous intensity distribution lens 50L.

A diameter of a portion (a core portion) for propagating light is about 10 mm–13 mm in each of the optical cables 30R, 30L, 40R and 40L. As each of these optical cables an optical fiber of a single core type is used (an optical fiber of the bundle type formed by bundling fine optical fibers may be used.)

Figure 6:
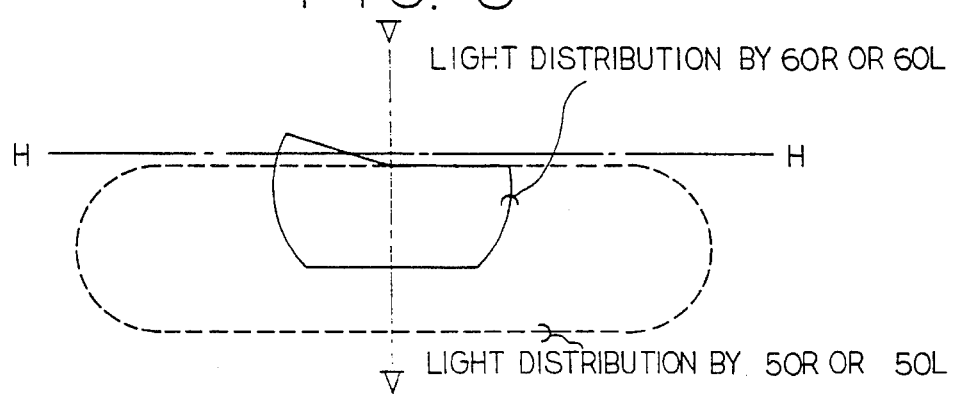
FIG. 6 is a luminous intensity distribution diagram illustrating a luminous intensity distribution range of the lighting fixture apparatus of FIG. 5.
Figure 8:
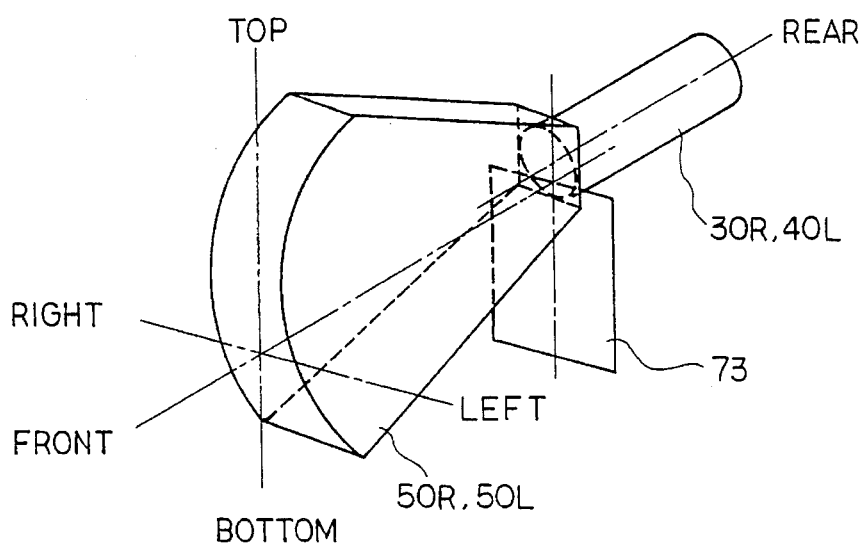
FIG. 8 is a perspective view showing a flat luminous intensity distribution lens of FIG. 5.

The flat luminous intensity distribution lenses 50R, 50L have the same configuration, of which details are shown in FIG. 8. The flat luminous intensity distribution lens 50R (50L) is formed into configuration of a convex lens shape in its top and bottom directions. Accordingly, light from the optical cable 30R (40L) is converged by the lens 50R (50L) between the top and bottom portions. Meanwhile, the flat luminous intensity distribution lens 50R (50L) does not have a lens shape at a left and right side directions. Thus, the light from the optical cable 30R (40L) is emitted by the lens 50R (50L) at an expanded state with convergence by the lens 50R (50L). Accordingly, an illuminating range of a flat luminous intensity distribution corresponding to the first right and second left illuminating ranges becomes an illuminating range expanded elongatedly along the horizontal direction H—H, as shown by a broken line in a luminous intensity distribution diagram of FIG. 6.

Furthermore, it is necessary to cut light locating above the substantially horizontal line so as not to give glaring to an oncoming vehicle. For this reason, a shade 73 is interposed between an outgoing portion of the optical cable and an incidental face of the flat luminous intensity distribution lens. If an upper end of the shade 73 is accorded with an optical axis of the lens, in this case, light which locates directly under the cut portion of light is emitted from the lens without aberration to provide brightness. As a direction of light outgoing from the head lamps for the vehicle approaches a direction nearer to the horizontal line, the outgoing light illuminates a distant place. Further, as the light is propagated to a distant place it expands and becomes dark, accordingly, in case brightness of light near the horizontal line is not maintained high, the lamp becomes one of low performance in which the distant place may not be seen clearly.

Figure 7:
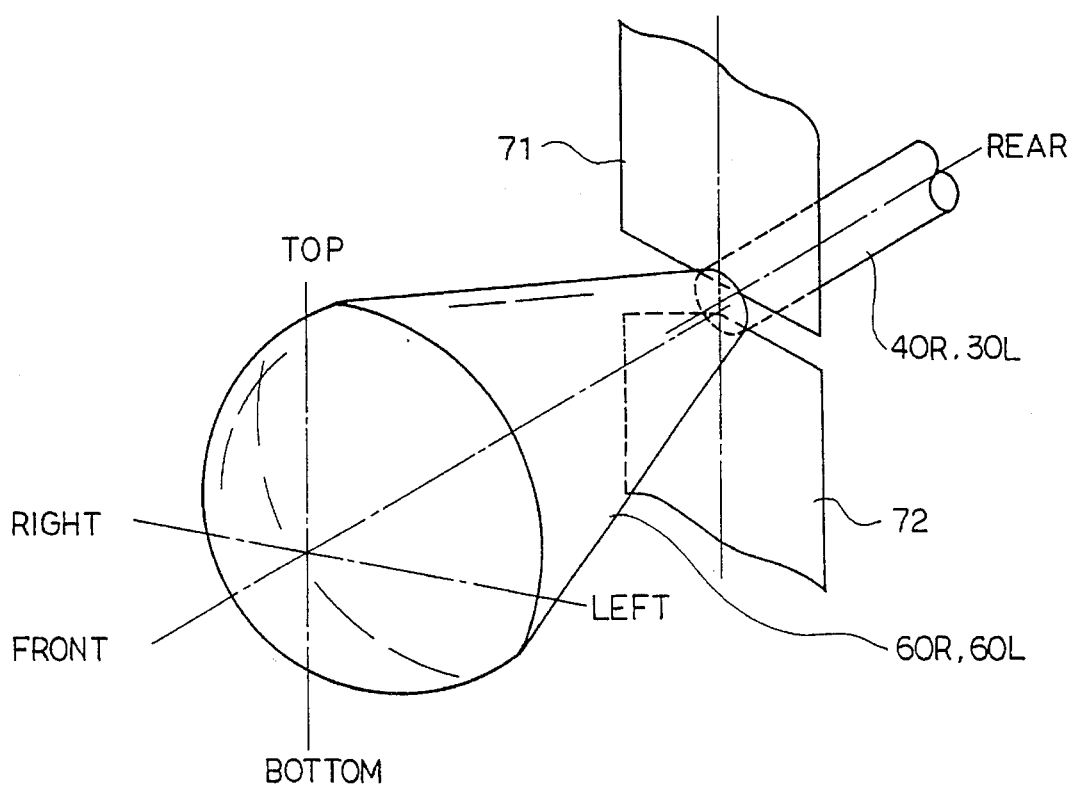
FIG. 7 is a perspective view showing a hot zone luminous intensity distribution lens of FIG. 5.

The hot zone luminous intensity distribution lenses 60R, 60L are a converging lens of the same configuration, of which details are shown in FIG. 7. There is also a method in which a part of light outgoing from an optical cable is emitted into air and then illuminated ahead by a convex lens locating in front of the optical cable. However, there are problems that increase in widths of the head lamp in its top-and-bottom and left-and-right directions become necessary due to optical loss caused by dusts in air and also that an attractive feeling of the head lamp becomes bad due to additional necessity of a portion for supporting the convex lens. Accordingly, in the embodiment used is a light guide lens in which a portion between an outgoing end of the optical cable and the opposing face of the convex lens is resinified. Of course a convex lens for converging light through air may be also used.

With regard to this hot zone luminous intensity distribution lens, a pair of shades 71, 72 are also provided so as not to give glaring to an oncoming vehicle. The shade 72 has a cutout portion at its upper portion. The upper end of the shade 72 is also accorded with the optical axis in case of the hot zone luminous intensity lens, on a basis of the reason like the case of the flat luminous intensity distribution lens. Accordingly an illuminating range of the hot zone luminous intensity distribution corresponding to the first left and second right illuminating ranges becomes an illuminating range which has converged at a central portion as shown by a solid line of the luminous intensity distribution diagram of FIG. 6. Because the shade 72 has the cutout portion as previously described, the luminous intensity distribution given by the hot zone lenses 60R, 60L is distributed such that the left side locating in front of vehicle is illuminated farther as compared with the right side locating in front of vehicle.

A luminous intensity distribution of the head lamps of the embodiment is formed by both groups of the flat luminous intensity distribution lenses 50R, 50L and the hot zone luminous intensity distribution lenses 60R, 60L.

Only the far center on the road may be illuminated by the hot zone luminous intensity distribution lenses 60R, 60L whereas only the left and right neighborhood may be illuminated by the flat luminous intensity distribution lenses 50R, 50L. Accordingly, the luminous intensity distributions from these two groups of the lenses should be constructed so as to be certainly realized simultaneously. A desired illuminating range may not be satisfied by only the luminous intensity distribution from either one of the groups.

Furthermore a right side lighting fixture 210 is formed by putting both of the flat and hot zone luminous intensity distribution lenses 50R and 60R in a single box which has a plate of transparent glass or transparent resin facing ahead of the automotive vehicle. The right side lighting fixture 210 is mounted on the right end of the front of the vehicle. Optical cables 30R, 40R are coupled to the respective rear portions of the flat and hot zone luminous intensity distribution lens 50R and 60R.

A left side lighting fixture 220 is formed by putting the flat and hot zone luminous intensity distribution lenses 50L and 60L in a single box which has a plate of transparent glass or transparent resin facing ahead of the vehicle. The left side lighting fixture 220 is mounted on the left end of the front of the vehicle. Optical cables 40L, 30L are coupled to the respective rear portions of the flat and hot zone luminous intensity distribution lenses 50L and 60L.

As understood from the above descriptions, a first optical transmission device 81 is constructed by the light source 91, the control circuit 110, the optical cable 30R, the flat luminous intensity distribution lens 50R, the optical cable 30L and the hot zone luminous intensity distribution lens 60L.

Meanwhile, a second optical transmission device 82 is constructed by the light source 92, the control circuit 120, the optical cable 40R, the hot zone luminous intensity distribution lens 60R, the optical cable 40L and the flat luminous intensity distribution lens 50L. Like this, the head lamp apparatus in the embodiment is constructed by two of the optical transmission devices, and this two optical transmission devices are constructed such that the flat luminous intensity distribution lens and hot zone luminous intensity distribution lens are located reversely at their left and right positions.

When the two light sources 91, 92 are normal, both of the right and left side lighting fixtures 210 and 220 are lit at their respective two lenses.

A luminous intensity distribution range of the flat luminous intensity distribution lens 50R connected to the first light source 91 is similar to a luminous intensity distribution range of the flat luminous intensity distribution lens 50L connected to the second light source 92. Furthermore, a luminous intensity distribution range of the hot zone luminous intensity distribution lens 60L connected to the first light source 91 is similar to a luminous intensity distribution range of the hot zone luminous intensity distribution lens 60R connected to the second light source 92.

Accordingly, even if either one of the light sources 91, 92 is extinguished due to damage of the light source, malfunction of its control circuit or the like, a requested illuminating range may be maintained without entirely losing illuminating light of either one of the flat luminous intensity distribution lens and the hot zone luminous intensity distribution lens. And the function as the head lamp may be also shown and the same illuminating range may be maintained before and after extinguishment of either one of the light sources.

In the embodiment even if the one light source is extinguished and the hot zone and flat luminous intensity distribution lenses connected to it are extinguished, either one of the hot zone and flat luminous intensity distribution lenses to which light is propagated from another light source exists in the left side lighting fixture to be maintained lighting and the other one of the hot zone and flat luminous intensity distribution lenses exists in the right side lighting fixture to be maintained lighting. Accordingly, a driver of an oncoming automotive vehicle and an walker may confirm the width of the automotive vehicle.

Furthermore, in the embodiment each of the right and left side lighting fixtures 210 and 220 is constructed so as to include therein both of the flat and hot zone luminous intensity distribution lenses. Besides, the illuminating ranges of the left and right flat luminous intensity distribution lenses are similar and the illuminating ranges of the left and right hot zone luminous intensity distribution lenses are similar. Even if illuminating light from either one of the lighting fixtures is intercepted by obstacles locating in front of it, accordingly, the similar illuminating range may be maintained by the flat and hot zone luminous intensity distribution lenses of the other lighting fixture which is not intercepted.

In the above-mentioned embodiment the head lamp apparatus for the automotive vehicle is constructed so as to include the flat and hot zone luminous intensity distribution lenses as an example of projectors. However, it may be replaced with a head lamp apparatus for an automotive vehicle which comprises projectors of more than three kinds including another projector in addition to the above-mentioned projectors.

Furthermore, the projector may not necessarily be a lens and may be replaced with a projector including partly or entirely one for reflecting and illuminating light like for instance a reflector.

Moreover, in the above-mentioned embodiment a predetermined illuminating range in which the projector distributes light is given by the flat and hot zone luminous intensity distributions both of which illuminating ranges are partly superposed. However, without limitation to this it may be also given by the flat and hot zone luminous intensity distributions both of which illuminating ranges are not superposed entirely.

In the above-mentioned embodiment both the illuminating ranges are given by relative position relationship that the illuminating range of the hot zone luminous intensity distribution is located at the central portion of the illuminating range of the flat luminous intensity distribution. However, without limitation to such relative position relationship both the illuminating ranges may be also given by a combination of for instance an illuminating range for a place distant from the automotive vehicle and an illuminating range for a near place or a combination of an illuminating range for the left side of a road surface and an illuminating range for the right side of the road surface.

Furthermore the control circuits described in the above-mentioned embodiment may be eliminated in necessity. Besides in the above embodiment the respective illuminating ranges of the left and right flat luminous intensity distribution lenses are similar and the illuminating ranges of the left and right hot zone luminous intensity distribution lenses are also similar. However, without limitation to these, ones of the former and latter respective illuminating ranges may be similar ranges and the other ones may be near ranges, or the former and latter respective illuminating ranges may not be similar but near ranges.

In these cases, even if illuminating light from either one of the lighting fixtures is intercepted by obstacles locating in front of the vehicle, the similar illuminating range may be maintained by the flat and hot zone luminous intensity distribution lenses of the other lighting fixture of which illuminating light is not intercepted.

Moreover, without restriction to head lamps having two optical transmission devices which illuminate light to a place locating in front of the vehicle, the present invention may be adapted to tail lamps, side lamps or fog lamps. The present invention may be also adapted to a combination of these lamps, that is, a combination of the head lamp and side lamp which are simultaneously lit, the tail lamp and side lamp which are simultaneously lit, the head lamp and fog lamp which are simultaneously lit or the like.

Besides, as examples in which the first and second illuminating ranges are near to each other, considered are an example in which both the illuminating range are not superposed but near, an example in which both the illuminating ranges are partly superposed, an example in which both the illuminating ranges are almost superposed, an example in which both the illuminating ranges are similar, an example in which both the illuminating range are the entirely same or the like.

Moreover, as an example in which the first right and second left projectors are arranged at the left side of the vehicle and the first left and second right projectors are arranged at the right side of the vehicle, considered are an example in which the former and latter projectors are arranged separately at the left and right ends of the vehicle, an example in which the former and latter projectors are arranged slightly nearer to the center of the vehicle than the left and right ends and an example in which the former and later projectors are maintained apart from each other but are considerably nearer to the center of the vehicle than the left and right ends.

Furthermore, as examples for providing the first right, first left, second right and second left projectors, considered are an example in which the respective projectors are mounted on the vehicle with the projectors put in either one of a single box, two boxes or more than three boxes and an example in which the projectors are directly mounted on the vehicle without putting of them in a box.

Besides, examples in which the first right and second left illuminating ranges are near ranges and the first left and second right illuminating ranges are near ranges, considered are an example in which both the respective illuminating ranges are not superposed but near, are partly superposed, are almost superposed, are similar, entirely the same or the like.

Furthermore, as the first group of plurality of projectors, considered is one for reflecting light like for instance a reflector in addition to a lens.

The present invention is not limited to the abovedescribed embodiments but may be modified in many ways without departing from the spirit of the invention.

What is claimed is:

1. A lighting fixture apparatus for a vehicle comprising:
    a pair of optical transmission devices for emitting light from the vehicle toward a front circumference of the vehicle;
    each of said optical transmission devices being provided with a single light source, two light emitting portions wherein either one of said two light emitting portions is arranged at a left side of the vehicle and the other one of said two light emitting portions is arranged at a right side of the vehicle, and optical fibers for propagating light from said single light source to said two light emitting portions; and
    said two light emitting portions of each of said optical transmission devices having respectively different light emitting functions which are combined to provide a predetermined lighting function at each of said right and said left sides of said vehicle.

2. A lighting fixture apparatus for a vehicle as claimed in claim 1,
    wherein each of said pair of optical transmission devices includes a first and second optical transmission devices;
    wherein said light emitting portion which is mounted on said first optical transmission device and arranged at a right side of the vehicle is a first right light emitting element;
    wherein said light emitting portion which is mounted on said first optical transmission device and arranged at a left side of the vehicle is a first left light emitting element;
    wherein said light emitting portion which is mounted on said second optical transmission device and arranged at the right side of the vehicle is a second right light emitting element;
    wherein said light emitting portion which is mounted on said second optical transmission device and arranged at the left side of the vehicle is a second left light emitting element; and
    wherein said first left and second right light emitting elements have the same light emitting function and said second left and first right light emitting elements have the same light emitting function.

3. A lighting fixture apparatus for a vehicle as claimed in claim 1,
    wherein said different light emitting functions are different light emitting colors; and
    wherein said predetermined necessary function is different of a light emitting color.

4. A lighting fixture apparatus for a vehicle as claimed in claim 3,
    wherein said pair of optical transmission devices is first and second optical transmission devices;
    wherein said light emitting portion which is mounted on said first optical transmission device and arranged at the right side of the vehicle is a first right light emitting element;
    wherein said light emitting portion which is mounted on said first optical transmission device and arranged at the left side of the vehicle is a first left light emitting element;
    wherein said light emitting portion which is mounted on said second optical transmission device and arranged at the right side of the vehicle is a second right light emitting element;
    wherein said light emitting portion which is mounted on said second optical transmission device and arranged at the left side of the vehicle is a second left light emitting element; and
    wherein said first left and second right light emitting elements emit light at the same color and said second left and first right light emitting elements emit light at the same color.

5. A lighting fixture apparatus for a vehicle as claimed in claim 1,
    wherein said different functions correspond to different illuminating ranges; and
    wherein said predetermined necessary function is to emit light to illuminate a necessary illuminating range by a combination of said different illuminating ranges.

6. A lighting fixture apparatus for a vehicle as claimed in claim 5, wherein said pair of optical transmission devices is first and second optical transmission devices;

wherein said light emitting portion which is mounted on said first optical transmission device and arranged at the right side of the vehicle is a first right light emitting element;

wherein said light emitting portion which is mounted on said first optical transmission device and arranged at the left side of the vehicle is a first left light emitting element;

wherein said light emitting portion which is mounted on said second optical transmission device and arranged at the right side of the vehicle is a second right light emitting element;

wherein said light emitting portion which is mounted on said second optical transmission device and arranged at the left side of the vehicle is a second left light emitting element;

wherein said first left and second right light emitting elements emit light at the same color, illuminating ranges of said first left and second right light emitting elements being similar; and wherein said second left and first right light emitting elements emit light at the same color, illuminating ranges of said second left and first right light emitting elements being similar.

7. A lighting fixture apparatus for a vehicle as claimed in claim 1, wherein said different functions correspond to different illuminating ranges; and wherein said predetermined necessary function is to illuminate a predetermined illuminating range.

8. A lighting fixture apparatus for a vehicle as claimed in claim 7, wherein said pair of optical transmission devices includes a first and second optical transmission devices;

wherein said light emitting portion which is mounted on said first optical transmission device and arranged at the right side of the vehicle is a first right light emitting element;

wherein said light emitting portion which is mounted on said first optical transmission device and arranged at the left side of the vehicle is a first left light emitting element;

wherein said light emitting portion which is mounted on said second optical transmission device and arranged at the right side of the vehicle is a second right light emitting element;

wherein said light emitting portion which is mounted on said second optical transmission device and arranged at the left side of the vehicle is a second left light emitting element;

wherein said first left and second right light emitting elements have the same illuminating ranges; and wherein said second left and first right light emitting elements have the same illuminating ranges.

9. A lighting fixture apparatus for a vehicle as claimed in claim 7, wherein said two light emitting portions mounted on said respective optical transmission devices are simultaneously lit; and wherein a pair of illuminating ranges, into which said different illuminating ranges, which said two light emitting portions have, are combined and formed corresponding to said respective transmission devices, are near ranges.

10. A lighting fixture apparatus for a vehicle comprising:

a first light source for providing a first light;

a second light source for providing a second light;

a first pair of right and left optical cables connected to said first light source for transmission of said first light;

a second pair of right and left optical cables connected to said second light source for transmission of said second light;

a pair of right and left flat luminous intensity distribution lenses for distributing light generally horizontally, said right flat lens being provided at a right front side of said vehicle and connected to said right optical cable of said first pair, and said left flat lens being provided at a left front side of said vehicle and connected to said left optical cable of said second pair; and a pair of right and left hot zone luminous intensity distribution lenses for distributing light in a narrow range, said right hot zone lens being provided at the right front side of said vehicle and connected to said right optical cable of said second pair, and said left hot zone lens being provided at the left front side of said vehicle and connected to said left optical cable of said first pair, said light generally horizontally distributed being combined with said light distributed in the narrow range normally and one of said first and second lights being distributed upon failure of the other of said first and second light sources.

11. A lighting fixture apparatus according to claim 10 further comprising:

a pair of right and left shades interposed between said right and left flat lenses and said right and left optical cables of said first and second pair, respectively, and said shades being positioned such that top edges thereof are in line with optical axes of said flat lenses;

a pair of right and left shades interposed between said right and left hot zone lenses and said right and left optical cables of said second and first pair, respectively, each of said shades including a top shade and a bottom shade having top edge thereof being in line with optical axes of said hot zone lenses and having a cutout portion at the top edge thereof.

12. A lighting fixture apparatus for a vehicle comprising:

first light means including a first light source, a first optical cable and a pair of first light projectors, one and the other of said first light projectors being different in light emitting function to each other, arranged at a front right and left sides of said vehicle for emitting light provided by said first light source and transmitted through said first optical cable outwardly from said right and left sides of said vehicle, respectively; and second light means being activated at the same time as said first light means including a second light source, a second optical cable and a pair of second light projectors, one and the other of said second light projectors being different in light emitting function to each other, arranged at a front right and left sides of said vehicle for emitting light provided by said second light source and transmitted through said second optical cable outwardly from said right and left sides of said vehicle, wherein the one of said first light projectors and the other of said second light projectors are the same in light emitting function and the other of said first light projectors and the one of said second light projectors are the same in light emitting function.

* * * * *